United States Patent
Silverstein et al.

(10) Patent No.: US 11,860,712 B1
(45) Date of Patent: Jan. 2, 2024

(54) SENSOR FAULT PREDICTION AND RESOLUTION

(71) Applicant: International Business Machines Corporation, Armonk, NY (US)

(72) Inventors: Zachary A. Silverstein, Georgetown, TX (US); Jacob Ryan Jepperson, St. Paul, MN (US); Jeremy R. Fox, Georgetown, TX (US); Spencer Thomas Reynolds, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/821,954

(22) Filed: Aug. 24, 2022

(51) Int. Cl.
*G06F 11/07* (2006.01)
*G16Y 40/40* (2020.01)

(52) U.S. Cl.
CPC ...... *G06F 11/0709* (2013.01); *G06F 11/0793* (2013.01); *G16Y 40/40* (2020.01)

(58) Field of Classification Search
CPC .. G06F 11/0709; G06F 11/0793; G16Y 40/40
See application file for complete search history.

(56) References Cited

U.S. PATENT DOCUMENTS

| | | | |
|---|---|---|---|
| 7,346,469 | B2 | 3/2008 | Taware |
| 8,706,676 | B2 | 4/2014 | Claxton |
| 9,963,215 | B2 | 5/2018 | Sidki |
| 2011/0139509 | A1* | 6/2011 | Pool .......... E21B 21/08 703/7 |
| 2019/0354922 | A1 | 11/2019 | Berti |
| 2021/0192639 | A1 | 6/2021 | Dalal |
| 2021/0201165 | A1 | 7/2021 | Pedersen |
| 2023/0057740 | A1* | 2/2023 | Montanari ......... A61B 5/02438 |

FOREIGN PATENT DOCUMENTS

WO 2019216941 A1 11/2019

OTHER PUBLICATIONS

"Digital Twin Market Size Worth $155,839.4 Million By 2030", Grand View Research, Mar. 2022, 8 pages, <https://www.grandviewresearch.com/press-release/global-digital-twin-market#>.

(Continued)

*Primary Examiner* — Joseph R Kudirka
(74) *Attorney, Agent, or Firm* — Daniel M. Yeates

(57) ABSTRACT

A computer-implemented method to identify and remediate a failing sensor. The method includes identifying a set of sensors in an Internet of Things (IoT) system including a first sensor, where the IoT system is configured to perform at least one action, the IoT system includes one or more IoT devices, each sensor is correlated to one IoT device of the one or more IoT devices, and each sensor sends an output data feed to the IoT system including a first data feed for the first sensor. The method further includes predicting, by a generative adversarial network (GAN), an expected output of the first sensor. The method also includes determining that a difference between the expected output and an actual output of the first sensor exceeds a first threshold. The method includes replacing, in response the difference exceeding the first threshold, the first data feed with a first generated data feed.

20 Claims, 4 Drawing Sheets

(56) References Cited

OTHER PUBLICATIONS

"Digital twin", From Wikipedia, the free encyclopedia, This page was last edited on Apr. 18, 2022, 11 pages.
"IBM Maximo Application Suite", IBM, downloaded from the Internet on Apr. 22, 2022, 11 pages, <https://www.ibm.com/products/maximo>.
"IBM TRIRIGA Application Suite", IBM, downloaded from the Internet on Apr. 22, 2022, 10 pages, <https://www.ibm.com/products/tririga>.
"IoT Solutions", IBM, downloaded from the Internet on Apr. 22, 2022, 8 pages, <https://www.IBM.com/cloud/internet-of-things>.
"What is a digital twin? ", IBM, downloaded from the Internet on Apr. 22, 2011, 11 pages, <https://www.ibm.com/topics/what-is-a-digital-twin>.
Almasri et al., "Data Fusion in WSNs: Architecture, Taxonomy, Evaluation of Techniques, and Challenges", International Journal of Scientific & Engineering Research, vol. 6, Issue 4, Apr. 2015, 17 pages.
Authors et. al.: Disclosed Anonymously, "Prediction of Faults or Data Conflicts from Numerous IoT Sensors", An IP.com Prior Art Database Technical Disclosure, IP.com No. IPCOM000268375D, IP.com Electronic Publication Date: Jan. 26, 2022, 5 pages.
Durrant-Whyte, Hugh F., "Sensor Models and Multisensor Integration", Autonomous Robot Vehicles, Springer, New York, NY, 1990, pp. 73-89.
Girao et al., "Data Fusion, Decision-Making, and Risk Analysis: Mathematical Tools and Techniques", pp. 205-250, in Data Modeling for Metrology and Testing in Measurement Science, Birkhäuser Boston, 2009, DOI 10.1007/978-0-8176-4804-6.
Li et al., "Target Information Processing: A Joint Decision and Estimation Approach", Final Report ARO Project (ARO W911NF-08-1-0409), Report Date: Mar. 30, 2012, University of New Orleans, 26 pages.
Mell et al., "The NIST Definition of Cloud Computing", Recommendations of the National Institute of Standards and Technology, Special Publication 800-145, Sep. 2011, 7 pages.
Schmitt et al., "The SEN1-2 Dataset for Deep Learning in SAR-Optical Data Fusion", arXiv:1807.01569v1 [cs.CV] Jul. 4, 2018, 6 pages.
Shiklo, Boris, "A Digital Twin Approach to Predictive Maintenance", Information Week, Nov. 26, 2018, 5 pages, <https://www.informationweek.com/ai-or-machine-learning/a-digital-twin-approach-to-predictive-maintenance>.

* cited by examiner

SENSOR FAULT PREDICTION AND RESOLUTION

BACKGROUND

The present disclosure relates to sensor data, and, more specifically, to optimizing predicting sensor drift based on analysis by artificial intelligence.

Modern computing networks can include a wide variety of sensors that collect and attempt to analyze large amounts of data in real time. This can be generally known as an Internet of Things (IoT). The data is gathered by various sensors, sent to a processor, analyzed, and then returned to the source to provide information and/or perform a function within the network.

SUMMARY

Disclosed is a computer-implemented method to identify and remediate a failing sensor. The method includes identifying a set of sensors in an Internet of Things (IoT) system including a first sensor, wherein the IoT system is configured to perform at least one action, the IoT system includes one or more IoT devices including a first IoT device, each sensor of the set of sensors is correlated to one IoT device of the one or more IoT devices, and each sensor sends an output data feed to the IoT system including a first data feed for the first sensor. The method further includes predicting, by a generative adversarial network (GAN), an expected output of the first sensor. The method also includes determining that a difference between the expected output and an actual output of the first sensor exceeds a first threshold. The method includes replacing, in response the difference exceeding the first threshold, the first data feed with a first generated data feed. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
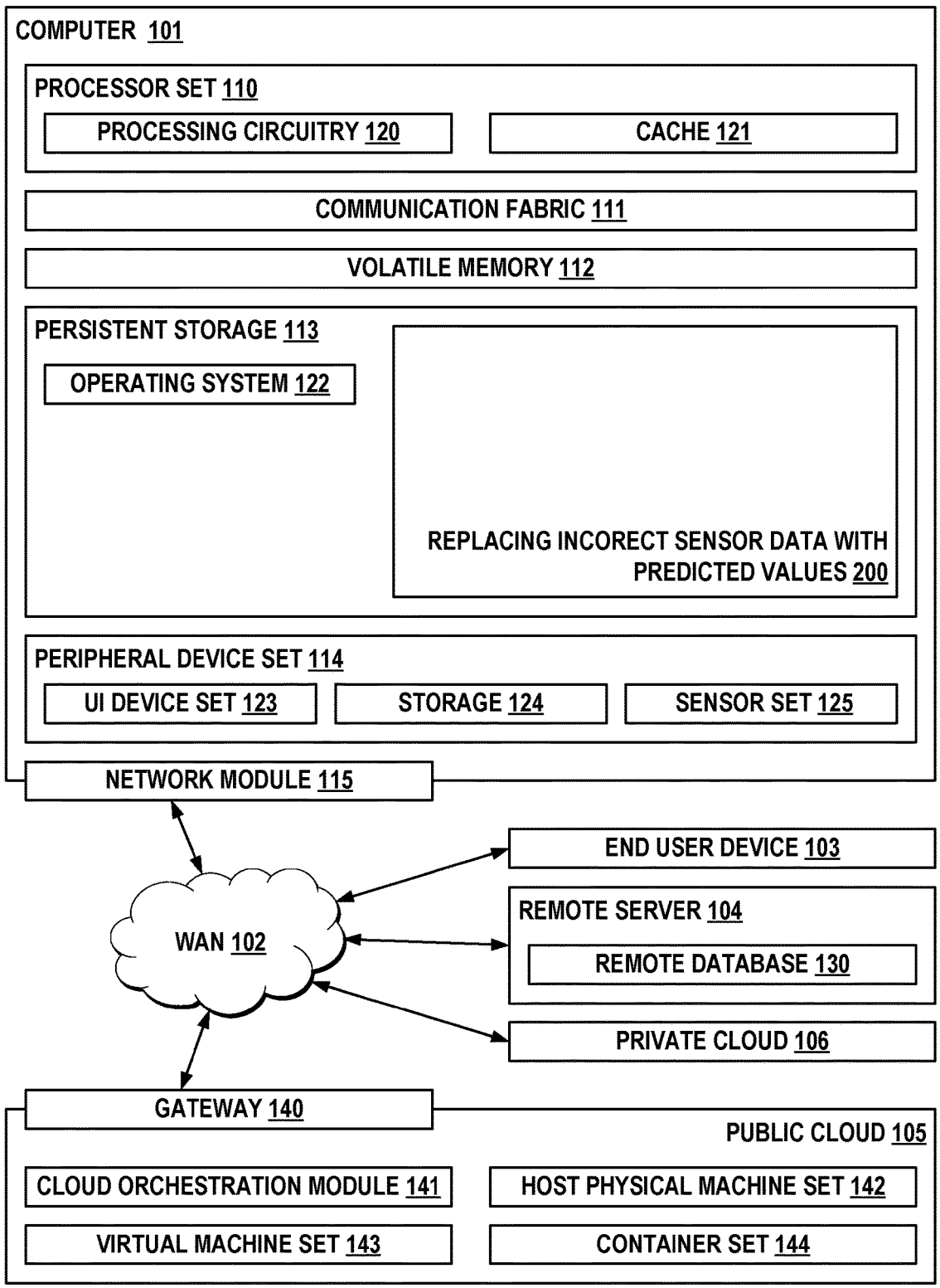
FIG. 1 is a block diagram of a computing environment suitable for operation of a sensor manager in accordance with some embodiments of the present disclosure.

The present disclosure relates to sensor data, and, more specifically, to optimizing predicting sensor drift/failure based on analysis by artificial intelligence.

Modern computing networks can include a wide variety of sensors that collect and attempt to analyze large amounts of data in real time. This can be generally known as the Internet of Things (IoT). The data is gathered by various sensors, sent to a processor, analyzed, and then returned to the source to provide information and/or perform a function within the network.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive method, such as replacing incorrect sensor data with predicted values 200. In addition to replacing incorrect sensor data with predicted values 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and replacing incorrect sensor data with predicted values 200, as identified above), peripheral device set 114 (including user interface (UI), device set 123, storage 124, and sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Some modern computing networks include a wide variety of sensors that collect and attempt to analyze large amounts of data in real time. This is generally known as the Internet of Things (IoT). An IoT system includes one or more IoT devices. Each of the IoT devices can gather data from one or more sensors and/or perform one or more tasks (e.g., operate a switch, send a notification, etc.) based on the gathered data. Each of the IoT devices are configured to communicate with each of the other devices and/or another computing device to store, manipulate, and/or analyze all of the sensor data.

The data is gathered by various sensors, is analyzed locally (e.g., where gathered) or remotely (with data from other IoT devices) and used to predict and/or trigger/perform various events/tasks. In some embodiments, the IoT network devices are configured to perform one or more functions and/or provide information to a user in the vicinity of the IoT system in response to the collected sensor data. A sensor that is sending incorrect data triggers events that otherwise would not or should not occur. This can be akin to a false negative or a false positive, versus a true negative or a true positive.

Because the IoT sensors are continuously gathering data, analyzing data, and communicating between devices, various sensor data can become conflicting and/or anomalous. For example, the device can output data that is different than expected based on conditions and/or the data can conflict with similar data from a different sensor. Having the wrong data can have negative effects on a local device, and/or a different device in the IoT network. For example, if an IoT network includes several thermometers and the system is configured to keep an enclosed space at a constant temperature, one thermometer reading lower or higher than expected can have one or more causes. For example, one cause can be that a portion of the space is changing temperature differently than other portions, and another cause can be that the thermometer is reading the temperature incorrectly. It can be important to know which of the two possibilities is correct, because the corrective action for the different possibilities is different. Continuing the example, if the thermometer is reading a temperature lower than the actual temperature, the overall system may increase a heat input to that portion of the space, when the correct action may be to recalibrate the thermometer. The extra heat can reduce efficiency by adding unneeded heat to the space, and/or the extra heat may cause a failure of the task associated with the heated area (e.g., an oven gets too hot and overcooks the substance in the oven).

Additionally, if it is determined that one or more sensors is producing incorrect or unpredicted data, then the connected IoT system/network may not operate as designed, as there can be automatic actions tied to the sensor readings. If a sensor output is bad, it may require the system to be shut down, and/or manual operation of a system, both of which can be undesirable.

Embodiments of the present disclosure can attempt to determine when a sensor is generating incorrect/wrong data. For purposes of this application, incorrect data or wrong data can mean data that is different than that which would be generated by a properly operating sensor in the conditions the sensor is configured to measure. For example, if a sensor is a thermometer or other temperature sensor, the wrong data will occur when the sensor's return temperature does not match the actual temperature of the monitored area. Also, embodiments of the present disclosure can utilize a variety of sensors to predict sensor failure. Said differently, embodiments of the present disclosure can distinguish between a true negative and a false negative, (or true positive and false positive) in regard to operation of an IoT system. For example, a low reading from a sensor can trigger an action. If the sensor fails, it can trigger the action, even though the actual conditions may not be correct for the action to occur. Embodiments of the present disclosure can determine/predict, before the action/failure occurs, the failure and change the data feed from the sensor to a generated data feed that predicts the actual value the sensor should be reading. This will prevent actions from occurring when they otherwise would not, and can increase the efficiency, and operation time of sensors and IoT systems as a whole.

Additionally, embodiments of the present disclosure can utilize one or more digital twins of an IoT device/sensor to replicate predicted actual data. In some embodiments, the sensor manager can generate and/or operate one or more digital twins. A digital twin can be a virtual simulation of one or more IoT devices configured to mimic the particular device/system, such as an IoT system. There can be one or more digital twins for any or all of the plurality of sensors and/or IoT devices. This can allow an IoT system to operate as though there is no error with any sensor and allow for time to correct/fix the sensor without any negative effect on the overall system.

The prediction can be based on a learning model. The learning model can be a generative adversarial model (GAN). A GAN can be a set of two or more learning models that work together to generate data and determine if data meets a set of requirements. In some embodiments, the GAN can determine when a sensor is producing invalid data (wrong data, or incorrect data). Invalid data can be data that is different than what should be output. For example, if the actual temperature of a room is 85 degrees Fahrenheit, but a sensor is reading 80 degrees Fahrenheit, the sensor would be producing invalid data. In some embodiments, the GAN is trained by analyzing historical data for each sensor/device/system. The system and/or the digital twins for the system can generate training data from various scenarios, real and staged (actual devices, or digital twins). During the scenarios, one or more sensors can be adjusted to mimic failure (e.g., turn off), or other operating conditions to gather data on anomalous scenarios.

Embodiments of the present disclosure can include a sensor manager. The sensor manager can monitor a plurality of sensor data being gathered and/or analyzed from an IoT system. The sensor monitor can track changes in the data of individual sensors and/or the system as a whole. In some embodiments, the sensor manager can predict expected readings for one or more of the sensors/IoT devices. In some embodiments, the predicted value can vary from the output value. If the difference exceeds a threshold, the sensor associated with the output value can be invalid data.

In some embodiments the sensor manager can determine when the sensor data is different from the predicted data for the same sensor. The determination can be based on the difference between the actual and predicted data exceeding a predefined threshold. In some embodiments, the exceeded threshold can indicate the sensor is producing incorrect data. The sensor manager can switch the system data stream from the sensor to the digital twin of that sensor.

Thus, the overall IoT system can continue even when the sensor is not operating correctly. In some embodiments, the sensor manager can return the sensor to operation, or switch the data stream from the digital twin to the sensor when the expected output value matches (or is within the threshold) of the actual output. In some embodiments, the sensor manager can indicate a sensor is in need of service. The service can include a calibration, a cleaning, replacement, or the like.

In some embodiments, the predicted output is based on an analysis of historical data, and using that data to train the one or more GANs. The data can be collected and analyzed on a sensory by sensor bases, a device bases (e.g., device can have one or more sensors), a complete IoT system, or any combination of the foregoing. In some embodiments the training/analysis can be based on environmental conditions. For example, the time of day, temperature, operating conditions, and the like can all affect how a sensor collects and outputs data. The various factors can be inputs into the GAN to determine a predicted value for a sensor.

The aforementioned advantages are example advantages, and embodiments exist that can contain all, some, or none of the aforementioned advantages while remaining within the spirit and scope of the present disclosure.

Figure 2:
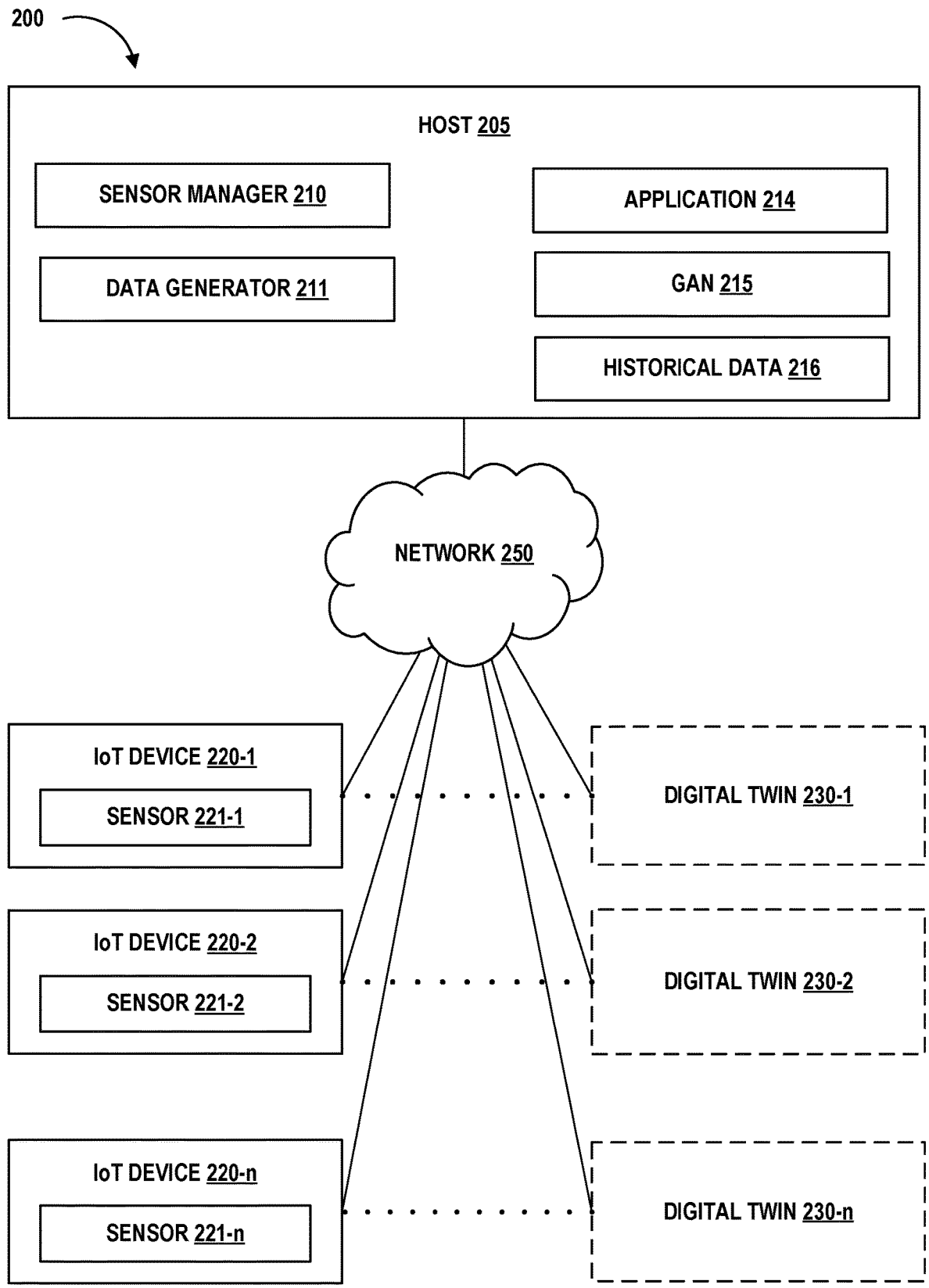
FIG. 2 illustrates a functional diagram of a computing environment suitable for operation of the sensor manager accordance with some embodiments of the present disclosure.

Referring now to various embodiments of the disclosure in more detail, FIG. 2 is a representation of a computing environment 200, that is capable of running sensor manager 200 in accordance with one or more embodiments of the present disclosure. Many modifications to the depicted environment may be made by those skilled in the art without departing from the scope of the disclosure.

Computing environment 200 (or IoT system) includes host 205, IoT device 220-1, IoT device 220-2, IoT device 220-n, digital twin 230-1, digital twin 230-2, digital twin 230-n and network 250, where n can represent any number. IoT device 220-1, IoT device 220-2, IoT device 220-n can be referred to individually, collectively, and/or severally as IoT device 220. Also, digital twin 230-1, digital twin 230-2, digital twin 230-n can be referred to individually, collectively, and/or severally as digital twin 230. Network 250 can be consistent with WAN 102 of FIG. 1. Network 250 may include one or more wired and/or wireless networks that are capable of receiving and transmitting data, voice, and/or video signals, including multimedia signals that include voice, data, and video information between and amount the various computing devices in computing environment 200. In some embodiments, host 205 and IoT device 220 can include a computer system, such as the computer 101 of FIG. 1.

Host 205 can be a standalone computing device, a management server, a web server, a mobile computing device, or any other electronic device or computing system capable of receiving, sending, and processing data. In other embodiments, host 205 can represent a server computing system utilizing multiple computers as a server system, such as in a cloud computing environment. In some embodiments, host 205 includes sensor manager 210, data generator 211, application 214, GAN 215, and historical data 216. In some embodiments, host 205 can be combined with one or more IoT device 220.

Sensor manager 210 can be any combination of hardware and/or software configured identify a wrong output from a sensor 221. In some embodiments, sensor manager 210 can monitor any number of output feeds. In some embodiments, sensor manager 210 can include one or more of data generator 211, application 214, GAN 215, and historical data 216.

In some embodiments, sensor manager 210 can determine when an output feed departs from an expected/predicted value by a predetermined threshold. In some embodiments, sensor manager 210 utilizes GAN 215 to determine when an output is not the expected output.

In some embodiments, sensor manager 210 can generate one or more digital twins. The digital twins can be for an IoT system, an IoT device 220, and/or a sensor 222. In some embodiments, two or more digital twins can be utilized together/concurrently. In some embodiments, sensor manager 210 can replace a sensor data feed with a digital twin feed for that particular sensor/IoT device. The GAN can generate the data used in the data feed. This can allow the overall system to operate when a sensor is not operating correctly.

In some embodiments, sensor manager 210 can generate a notification. The notification can include which sensor is producing invalid data. The notification may also include a recommended corrective action. The corrective action may include replacement, calibration, cleaning, waiting (e.g., environmental conditions to change, etc.), and the like. Sensor manager 210, can restore the sensor feed. This can be in response to the corrective action on the sensor being completed.

Application 214 can be any combination of hardware and/or software configured to carry out a function on a computing device (e.g., host 205). In some embodiments, application 214 is a web application. In some embodiments, application 214 can be configured to operate one or more of IoT device 220 and/or an IoT system. For example, application 214 can be configured to perform one or more tasks based on receiving an input from and IoT device 220. The task can be turn on lights, lock a door, activate a switch, send a notification, and the like.

GAN 215 can be any machine learning system configured to predict an output of a sensor. In some embodiments, GAN 215 is trained by data in historical data 216. In some embodiments, GAN 215 can include a generative adversarial model. A generative adversarial model includes two different learning models. The two models work together to learn to predict specific outputs, based on the inputs. In some embodiments, GAN 215 includes a generator learning model (generator) and a discriminator learning model (discriminator).

The discriminator is a neural network configured to determine if data is valid or invalid (relevant or irrelevant). In some embodiments, the discriminator can determine if the data that output from a sensor is valid. The neural network may be trained by a set of training data and based on the one or more of the actions of the user (e.g., asking a question), the intents linked to the utterance, and the feedback provided by the user. In some embodiments, the discriminator will output whether the feedback is valid or invalid.

In some embodiments, discriminator is trained by training data. In some embodiments, discriminator 136 is trained by a subset of the data in training data 138. For example, only feedback and subject matter expert (SME) determined to be valid may be used to train discriminator 136.

The generator is a neural network configured to generate data. In some embodiments, the generated data is based on the training data. In some embodiments, the generated data predicts what the output of a sensor will be. The generated data is intended to imitate the actual output of the relevant sensor/IoT device 220. The generator and discriminator work symbiotically to better both determine whether the output of data is correct data, and to generate data that would be determined to be correct data by the discriminator. During training, the generator generates sensor outputs based on inputs from historical data 216. The discriminator can determine if the data is good or bad data, or expected or not expected. At times, the generator will choose a bad data point (that represents data that is not actual data), and the discriminator will determine that the data point is bad data. This is later used by the generator to better predict acceptable values.

In some embodiments, GAN 215, the generator, and/or the discriminator may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, GAN 215 may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Historical data 216 can be any combination of hardware and/or software configured to store and compile data for the outputs of IoT device 220 and/or sensor 221. In some embodiments, historical data can store data for output conditions based on a set of inputs. The input conditions can be from any sensor/device inside or outside of the current IoT network. For example, historical data can include humidity data obtained from remote source related to a temperature sensor output. Historical data 216 can include data for each IoT system, each IoT device 220, and/or each sensor 221 in any combination. The data can include when various IoT devices 220 have been calibrated, replaced, repaired, and the like, as well as changes in readings surrounding noted events. In some embodiments historical data 216 can be used to train and/or update GAN 215.

In some embodiments historical data 216 includes variance/threshold for each sensor. The thresholds can represent a high and/or a low value that bound an acceptable value. When the sensor output is within the range, (e.g., above the low threshold and/or below the high threshold), the data point can be considered correct/accurate/true data. In some embodiments, the threshold is constant. In some embodiments, the threshold is based on current conditions. The threshold can be based on a confidence training score for each sensor/device. The higher the confidence score, the better the GAN 215 can determine the sensor is outputting incorrect data.

IoT device 220 can be any combination of hardware and/or software configured to collect and utilize data. In some embodiments, each IoT device 220 can include one or more sensors and/or perform one or more actions (e.g., active a switch, etc.). In some embodiments, the action can be initiated/suspended based on data from the same and/or a different IoT device 220. In some embodiments, IoT device 220 can be configured to perform one or more tasks/actions. The tasks can include, among other things, operating a switch, generating a notification/recommendation, starting a motor, pushing a piston, etc. The task can be based on data collected from the same and/or different IoT devices. In some embodiments, each IoT device 220 can be referred as a separate device. For example, IoT Device 220-1 is a first IoT device, IoT device 220-2 a second IoT device and so on for all IoT devices 220.

Sensor 221 can be any combination of hardware and/or software configured to gather data in the vicinity of the associated IoT device 220. Each IoT device 220 can include any number of sensors. In some embodiments IoT device 220-1 includes sensor 221-1, IoT device 220-2 includes sensor 221-2, and IoT device 220-n includes sensor 221-n. IoT device 220 can include any number of sensors. The any number of sensors can be of the same and/or different type of sensor. Additionally, the various IoT devices can had a different number of sensors. For example, IoT device 221-1 can include sensor 221-1 and sensor 221-4 (not shown), and IoT device 220-3 can include sensor 221-3, and sensor 221-7 (not shown), and IoT device 220-2 may include only sensor 221-2. In some embodiments, the type of sensors includes one or more of cameras, thermometers, heat detectors, moisture detectors, motion detections, microphones, distance detectors, motion detectors, and the like. The number and type of sensors can be configured to gather enough data to perform one or more tasks associated with the IoT system and/or any IoT device 220. In some embodiments, the data from each sensor 222 is sent to sensor manager 210, and/or application 214. Each of sensor 221-1, 221-2, through 221-n can be of the same or different type of sensor.

Data generator 211 can be any combination of hardware and/or software configured to generate an output for one or more sensors. In some embodiments, data generator 211 is activated when sensor manager 210 determines a particular sensor has a wrong data output. Data generator 211 can replicate and replace the wrong data output in the application 214 and/or an IoT system. In some embodiments data generator 211 obtains the generated output from GAN 215 and/or the predictor learning model. In some embodiments, the generated output is associated with one or more digital twin 230.

Digital twin 230 can be any combination of hardware and/or software configured to virtually reflect an IoT Device 220 and/or a sensor 221. Digital twin 230 can be configured to reflect/imitate one or more IoT systems, any number of IoT device 220, and/or any number of sensors 221. In some embodiments, digital twin 230 can be used to generate data about the system it is reflecting. The data can be stored in historical data 216. In some embodiments, each digital twin 230 is correlated to a specific IoT device 220. For example, digital twin 230-1 can be the digital twin for IoT device 220-1, and so forth. In some embodiments each sensor can have a unique digital twin 230. For example, if IoT device 220-1 has two sensors, a first digital twin 230-1 can be for the first sensor on IoT device 220-1 and digital twin 230-2 can be for the second sensor on IoT device 220-1.

Figure 3:
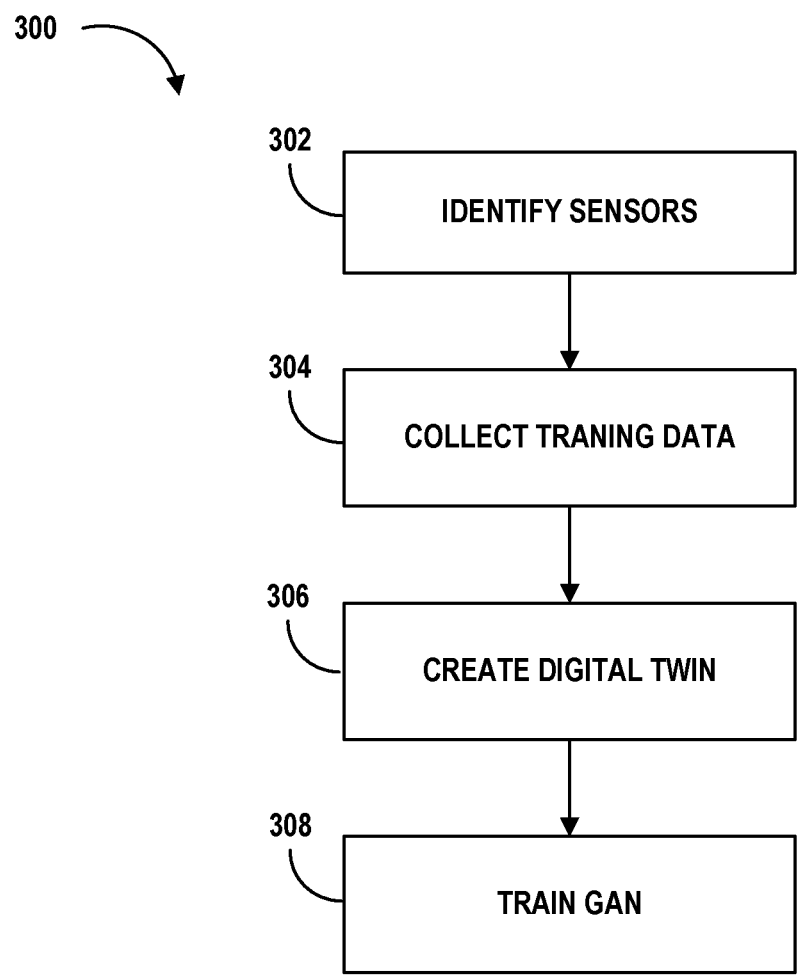
FIG. 3 illustrates a flow chart of an example method to train a generative adversarial network to identify failing sensors in accordance with some embodiments of the present disclosure.

FIG. 3 depicts a flowchart of an example method, method 300, for training a GAN (e.g., GAN 215) to identify sensors outputting incorrect data that can be performed in a computing environment (e.g., computing environment 100 and/or computing environment 200). One or more of the advantages and improvements described above for training a GAN to identify sensors outputting incorrect data may be realized by method 300, consistent with various embodiments of the present disclosure.

Method 300 can be implemented by one or more processors, host 205, sensor manager 210, data generator 211, application 214, GAN 215, historical data 216, IoT devices 220, sensor, 221, digital twin 230 and/or a different combination of hardware and/or software. In various embodiments, the various operations of method 300 are performed by or utilize one or more of host 205, sensor manager 210, data generator 211, application 214, GAN 215, historical data 216, IoT devices 220, sensor, 221, and digital twin 230. For illustrative purposes, the method 300 will be described as being performed by sensor manager 210.

At operation 302, sensor manager 210 identifies a set of sensors. In some embodiments, the set of sensors includes all sensors in an IoT system. The IoT system can be associated with a task, a location, a building, a process, a machine, and the like. The set of sensors can be of any type and associated with any number of IoT devices 220.

At operation 304, sensor manager 210 collects training data. In some embodiments, sensor manager 210 can monitor operation of each sensor of the set of sensors and store the data. The collected data can include data gathered from outside of the set of sensors. This can be from other sensors and/or a remote database. For example, weather data can be stored with sensor data to determine how/when external factors affect the sensors output. In some embodiments, the collected data can be stored in historical data 216. In some embodiments, a subject matter expert (SME) can add and/or remove data from the training data.

In some embodiments, gathering training data includes altering operation of one or more sensors of the set of sensors. The alteration can be simulating a failure condition and/or a suboptimal condition. For example, the sensor can be turned off to simulate complete failure. This can provide data for how each additional sensor of the set of sensors reacts when one fails. In another example, calibration of a sensor can be adjusted. This can be used to show the effect of a sensor that is out of calibration and/or affected by other outside factors.

At operation 306, sensor manager 210 creates a digital twin for the set of sensors. In some embodiments, the number of digital twins can be the same or different than the number of sensors in the set of sensors. In some embodiments, the digital twins can be used to generate additional training data. The digital twins can be used to generate the suboptimal condition data as well.

At operation 308, sensor manager 210 trains a GAN. In some embodiments, the GAN in GAN 215. The GAN can be trained by the gathered training data and/or by data stored in historical data 216. In some embodiments, the GAN is trained to predict and output for one or more sensors of the set of sensors. Additionally, the GAN can be trained to identify when a sensor output is different than the expected output. In some embodiments, the GAN is trained to identify a sensor is failing, and/or needs some other maintenance for proper operation. In some embodiments, the GAN is trained to provide a sensor output data stream consistent with the actual data output of the sensor. The output can be based on the predicted device.

Figure 4:
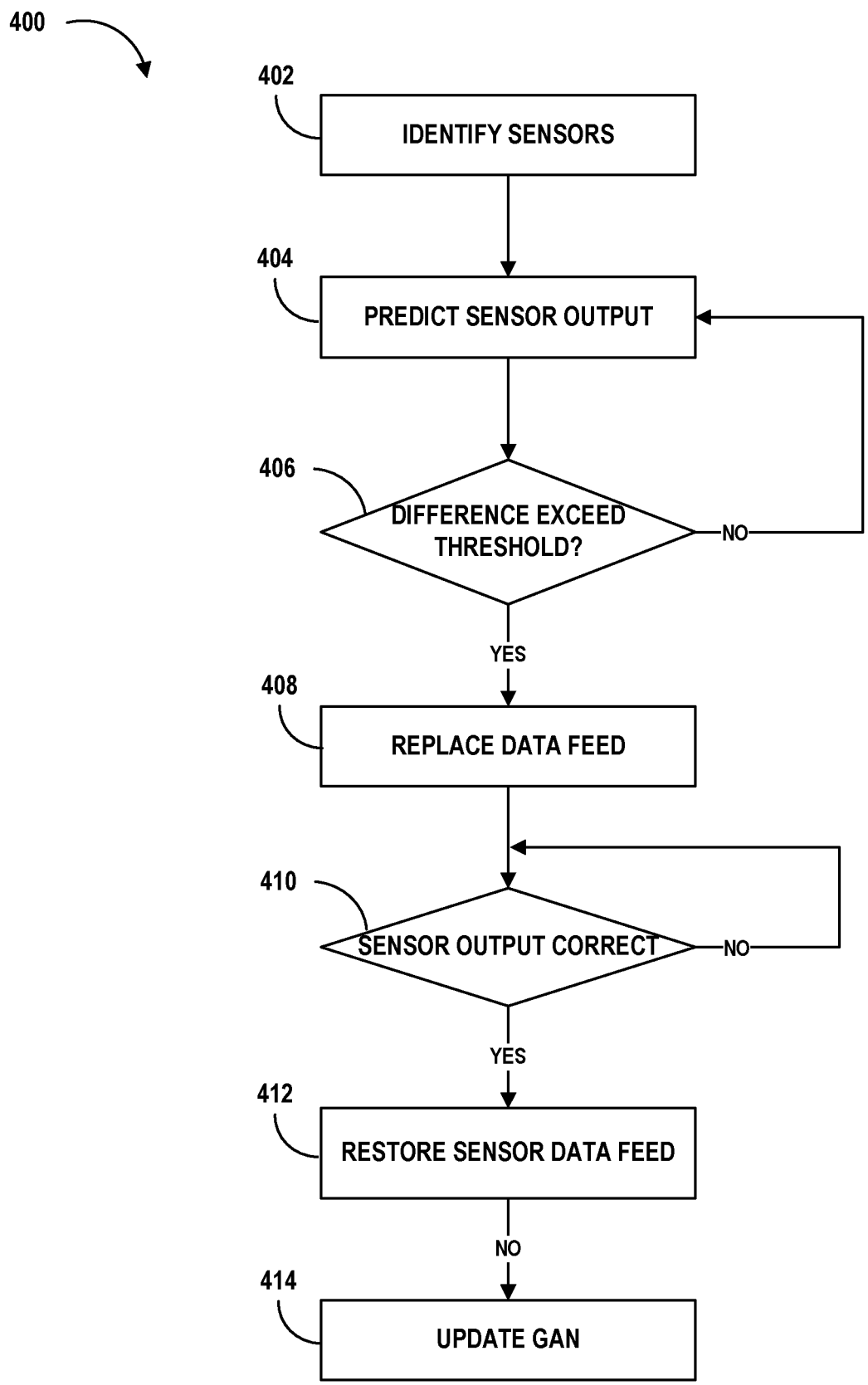
FIG. 4 illustrates a flow chart of an example method to replace a data feed for a failing sensor in accordance with some embodiments of the present disclosure.

FIG. 4 depicts a flowchart of an example method, method 400, for identifying and replacing a data feed for a failing sensor that can be performed in a computing environment (e.g., computing environment 100 and/or computing environment 200). One or more of the advantages and improvements described above for identifying replacing a data feed for a failing sensor may be realized by method 300, consistent with various embodiments of the present disclosure.

Method 400 can be implemented by one or more processors, host 205, sensor manager 210, data generator 211, application 214, GAN 215, historical data 216, IoT devices 220, sensor, 221, digital twin 230 and/or a different combination of hardware and/or software. In various embodiments, the various operations of method 300 are performed by one or more of host 205, sensor manager 210, data generator 211, application 214, GAN 215, historical data 216, IoT devices 220, sensor, 221, and digital twin 230. For illustrative purposes, the method 300 will be described as being performed by sensor manager 210.

At operation 402, sensor manager 210 identifies a set of sensors. In some embodiments, operation 402 can be consistent with operation 302 of FIG. 3.

At operation 404, sensor manager 210 predicts an output for one or more sensors of the set of sensors. In some embodiments, the prediction is generated by GAN 215. The prediction can rotate through each sensor. In some embodiments, the predicted value is based on the training of GAN 215 and/or data stored in historical data 216. The predicted value can be based on a digital twin of the sensor. In some embodiments, operation 404 includes comparing the predicted value to an actual output the sensor. The comparing can include determining a difference between the actual value and the precited value.

At operation 406, sensor manager 210 determines if the difference between a predicted output and the actual output of the sensor exceeds a threshold. In some embodiments, the difference can be an absolute threshold. For example, the actual value can be higher or lower than the predicted value. In some embodiments, the threshold is a predetermined value. The predetermined threshold can be manually set. In some embodiments, the threshold is dynamically set. The threshold can be based on one or more the type of sensors, the number of sensors in the system, the amount of historical data for the sensor, time since maintenance, environmental factors and the like. Each sensor can have a unique threshold. The threshold can be based on the type of sensor and/or an associated IoT device. The threshold can be a number value difference, or a percentage difference. If it is determined that the difference exceeds the threshold (406:YES), then sensor manager 210 proceeds to operation 408. If it is determined that the difference does not exceed the threshold, then sensor manager 210 returns to operation 404.

At operation 408, sensor manager 210 replaces the sensor data feed. In some embodiments, the sensor data feed is replaced by a data feed from a digital twin 230. The digital twin can be associated with the sensor. In some embodiments, the digital twin can output a data feed of the same type and frequency of data as the sensor. The feed is routed to application 214 as if it was from the sensor. In some embodiments, the output data is generated by data generator 211. The generated data can be the same value as the predicted data. The generated data can change based on the change in conditions, the same as if the sensor were operation. In some embodiments, sensor manager 210 can perform the functions of the IoT system using the generated data feed. The functions can be based on a change in the predicted data.

In some embodiments, operation 408 includes generating a notification. The notification can indicate the sensor has generated invalid data. The notification can include the actual data, the predicted data, and/or a recommended correction. The recommended correction can include replacement of the sensor, repair of the sensor (e.g., cleaning, etc.), maintenance (e.g., calibration, etc.), and/or waiting/no action. In some embodiments, operation 408 includes initiating, based on data from the generated data feed, one or more actions/events by one or more IoT devices.

At operation 410, sensor manager 210 determines the sensor output is valid. In some embodiments, the sensor is checked after completion of the recommended correction.

An indication of completion can be received by sensor manager 210. The indication can be input by an SME. In some embodiments, sensor manager 210 continuously monitors the sensor. The output can be valid when the difference between the actual output and the predicted output falls below the threshold. If it is determined the actual output is valid (210:YES), then sensor manager 210 can proceed to operation 412. If it is determined the actual output is not valid (210:NO), then sensor manager 210 can stay at operation 410.

At operation 412, sensor manager 210 restores the sensor output. In some embodiments, the restored actual output replaces the predicted/generated output. The IoT system can operate using the actual sensor output.

At operation 414, sensor manager 210 updates the GAN. In some embodiments, the GAN can be updated based on the data gathered while the data feed was replaced. In some embodiments, the IoT device continues to record data, and the data output can be added to training data.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a set of sensors in an Internet of Things (IoT) system including a first sensor, wherein the IoT system is configured to perform at least one action, the IoT system includes one or more IoT devices including a first IoT device, each sensor of the set of sensors is correlated to one IoT device of the one or more IoT devices, and each sensor sends an output data feed to the IoT system including a first data feed for the first sensor;
   predicting, by a generative adversarial network (GAN), an expected output of the first sensor;
   determining that a difference between the expected output and an actual output of the first sensor exceeds a first threshold; and
   replacing, in response to the difference exceeding the first threshold, the first data feed with a first generated data feed.

2. The computer-implemented method of claim 1, wherein conditioned upon the difference exceeding the threshold indicates the first sensor is outputting incorrect data, the method further comprising:
   repairing the first sensor;
   determining, in response to the repairing, that the difference is reduced below the first threshold; and
   restoring, in response to the difference being reduced below the first threshold, the first data feed to the IoT system by removing the first generated data feed.

3. The computer-implemented method of claim 1 further comprising:
   generating a digital twin for each IoT device in the IoT system including each sensor of the set of sensors, wherein each digital twin is configured to mimic a corresponding IoT device.

4. The computer-implemented method of claim 3, further comprising:
   collecting a set of training data for each sensor of the set of sensors, wherein the training data includes a set of historical data for each sensor of the set of sensors; and
   training the GAN to predict an expected output for each sensor and to generate a data feed for each sensor.

5. The computer-implemented method of claim 4, wherein the training the GAN comprises running simulations of the IoT system for each digital twin.

6. The computer-implemented method of claim 5, wherein a simulation includes simulating failure of the first sensor by turning off the first IoT device.

7. The computer-implemented method of claim 5, wherein a simulation includes an altering of an output feed of a first digital twin of the first IoT device based on environmental factors surrounding the first digital twin.

8. The computer-implemented method of claim 7, wherein the first generated data feed is generated by the GAN through the first digital twin.

9. The computer-implemented method of claim 1, further comprising:
   initiating, based on a value of the first generated data feed, an action of the at least one action.

10. The computer-implemented method of claim 1, wherein an action of the at least one action is activated based on the first data feed, and the replacing the first data feed is configured to prevent the action from incorrect data in the first data feed.

11. A system comprising:
    a processor; and
    a computer-readable storage medium communicatively coupled to the processor and storing program instructions which, when executed by the processor, are configured to cause the processor to:
    identify a set of sensors in an Internet of Things (IoT) system including a first sensor, wherein the IoT system is configured to perform at least one action, the IoT system includes one or more IoT devices including a first IoT device, each sensor of the set of sensors is correlated to one IoT device of the one or more IoT devices, and each sensor sends an output data feed to the IoT system including a first data feed for the first sensor;
    predict, by a generative adversarial network (GAN), an expected output of the first sensor;
    determine that a difference between the expected output and an actual output of the first sensor exceeds a first threshold; and
    replace, in response to the difference exceeding the first threshold, the first data feed with a first generated data feed.

12. The system of claim 11, wherein the program instructions are further configured to cause the processor to:
    repair the first sensor;
    determine, in response to the repairing, that the difference is reduced below the first threshold; and
    restore, in response to the difference being reduced below the first threshold, the first data feed to the IoT system by removing the first generated data feed.

13. The system of claim 11, wherein the program instructions are further configured to cause the processor to:
    generate a digital twin for each IoT device in the IoT system including each sensor correlated to each IoT device, wherein each digital twin is configured to mimic a corresponding IoT device.

14. The system of claim 11, wherein the program instructions are further configured to cause the processor to:
- collect a set of training data for each sensor of the set of sensors, wherein the training data includes a set of historical data for each sensor of the set of sensors; and
- train the GAN to predict an expected output for each sensor based and to generate a data feed for each sensor.

15. The system of claim 11, wherein the program instructions are further configured to cause the processor to:
- initiate, based on a value of the first generated data feed, a first action of the at least one action.

16. A computer program product, the computer program product comprising a computer readable storage medium having program instructions embodied therewith, the program instructions executable by a processing unit to cause the processing unit to:
- identify a set of sensors in an Internet of Things (IoT) system including a first sensor, wherein the IoT system is configured to perform at least one action, the IoT system includes one or more IoT devices including a first IoT device, each sensor of the set of sensors is correlated to one IoT device of the one or more IoT devices, and each sensor sends an output data feed to the IoT system including a first data feed for the first sensor;
- predict, by a generative adversarial network (GAN), an expected output of the first sensor;
- determine that a difference between the expected output and an actual output of the first sensor exceeds a first threshold; and
- replace, in response to the difference exceeding the first threshold, the first data feed with a first generated data feed.

17. The computer program product of claim 16, wherein the program instructions are further configured to cause the processing unit to:
- monitor an actual output of the first data feed;
- determine, in response to the monitoring, the difference is reduced below the first threshold; and
- restore, in response to the differing being reduced below the first threshold, the first data feed to the IoT system by removing the first generated data feed.

18. The computer program product of claim 17, wherein the program instructions are further configured to cause the processing unit to:
- generate a digital twin for each IoT device in the IoT system including each sensor correlated to each IoT device, wherein each digital twin is configured to mimic a corresponding IoT device.

19. The computer program product of claim 18, wherein the program instructions are further configured to cause the processing unit to:
- collect a set of training data for each sensor of the set of sensors, wherein the training data includes a set of historical data for each sensor of the set of sensors; and
- train the GAN to predict an expected output for each sensor based and to generate a data feed for each sensor.

20. The computer program product of claim 19, wherein an action of the at least one action is activated based on the first data feed, and the replacing the first data feed is configured to prevent the action from incorrect data in the first data feed.

* * * * *